United States Patent [19]

Ehrig et al.

[11] Patent Number: 4,824,736

[45] Date of Patent: Apr. 25, 1989

[54] GASOLINE TANK OF TIN-FREE (ELECTROPLATE CHROME-CHROME OXIDE COATED) STEEL COATED WITH A MALEIC ANHYDRIDE MODIFIED POLYPROPYLENE

[75] Inventors: Raymond J. Ehrig, Upper St. Clair Township, Allegheny County; Richard C. Weil, Monroeville, both of Pa.

[73] Assignee: Aristech Chemical Corporation, Pittsburgh, Pa.

[21] Appl. No.: 99,966

[22] Filed: Sep. 23, 1987

[51] Int. Cl.[4] ............................................. B65D 25/36
[52] U.S. Cl. ..................................... 428/623; 428/626; 428/667; 220/1 B

[58] Field of Search ...................... 220/855, 1 B, 5 A; 428/621, 623, 624, 625, 626, 667

[56] References Cited

U.S. PATENT DOCUMENTS 4,606,953  8/1986  Suzuki et al. ..................... 428/461
4,690,856  9/1987  Ito et al. ............................. 428/461

*Primary Examiner*—L. Dewayne Rutledge
*Assistant Examiner*—George Wyszomierski
*Attorney, Agent, or Firm*—William L. Krayer

[57] ABSTRACT

A tin-free steel gasoline tank coated with a maleic anhydride modified polypropylene or ethylene propylene impact copolymer made by reactive processing is described. The coating exhibits good adhesion to the steel and the tank is resistant to attack by gasoline-alcohol mixtures and water which may condense in the tank.

14 Claims, No Drawings

GASOLINE TANK OF TIN-FREE (ELECTROPLATE CHROME-CHROME OXIDE COATED) STEEL COATED WITH A MALEIC ANHYDRIDE MODIFIED POLYPROPYLENE

TECHNICAL FIELD

This invention relates to tanks for holding gasoline and particularly to tanks which may be vulnerable to corrosion because of reactions with alcohols or derivatives of alcohols which may be present in the tanks. The tanks are of electroplated chromium-chromium oxide coated, or ECCO, steel, commonly referred to as tin-free steel, coated with polypropylene which has been modified with maleic anhydride in a cracking environment.

BACKGROUND ART

Prior to the present invention, it has been known to modify crystalline polypropylene by reacting it in the presence of a peroxide with maleic anhydride. See, for example, U.S. Pat. No. 3,414,551, which describes (col. 1, lines 35-40) a process involving mechanical working of the polymer in the presence of maleic anhydride and a peroxide, with the addition of heat. The resulting maleated polypropylene is known to "have outstanding utility as an adhesive for adhering crystalline polypropylene to metal" (col. 1, line 24).

Some of the prior art methods do not employ a vigorous mechanical working and a peroxide together when incorporating the maleic anhydride. See, for example, U.S. Pat. No. 3,161,620, which does not use vigorous mechanical working. Generally, the best results in the prior art appear to have been obtained, i.e. the most efficient addition of maleic anhydride to polypropylene is obtained, when the mechanical working is more than mere mixing. Specifically, the conditions should be similar to those employed in manufacturing a "controlled rheology" polypropylene from a high molecular weight crystalline polypropylene by placing the polypropylene in an extruder with a peroxide. See U.S. Pats. Nos. 3,932,368 (Example 2), 3,862,265 and 4,026,967.

Maleic anhydride ("MA") modified polypropylene has been suggested as a laminate (U.S. Pat. No. 4,617,240) and a coating for various metals (see U.S. Pat. No. 4,031,062; however, when used in the interior of washing machines, for example it tends to "disbond" under the influence of detergents. See U.S. Pat. No. 4,599,385 (col. 5, lines 3-29). It is not clear how the "disbonded" material was made. The method of manufacture clearly affects the tenacity of the adhesion, at least to metal surfaces. Graft copolymers of high density polyethylene and ethylenically unsaturated acids such as maleic acid are used as coatings for steel to be processed by drawing and redrawing to make cans, in U.S. Pat. No. 4,452,375.

The reader may also be interested in U.S. Pat. No. 4,461,809, which employs a "peel test" for "gasoline resistance" applied to a maleic anhydride modified propylene-ethylene copolymer adhering to a polymeric base.

SUMMARY OF THE INVENTION

The most frequently used material of construction for gasoline tanks in the U.S.A. is terne-coated steel. Terne is a 92% lead 8% tin alloy coating that has been applied to steel to reduce environmental corrosion of the tank. Internal corrosion is caused by the presence of water in the gasoline resulting from condensation of water vapor during long-term underground storage as well as short-term storage in the auto gasoline tank itself. External corrosion by water and salts, especially under the retaining straps, is also a big problem. Terne has been a satisfactory reducer of corrosion in the past. However, since the blending of methanol with gasoline in the past few years, the use of terne is no longer desirable. The alcohol reacts with the lead, forming a white powder which becomes suspended in the gasoline and ultimately clogs the gasoline filter or carburetor causing malfunction of the engine. In addition, as the lead reacts and flakes off, steel surfaces (lead-free) are exposed to corrosion by water present in the gasoline. General Motors has developed a process, called Dorrlform, which improves the corrosion resistance of terne. This consists of an aluminum-rich epoxy coating on one side and a zinc-rich epoxy coating on the other. The Dorrlform process, however, has not become widely adopted commercially.

Other substitutes for terne generally have exhibited deficiencies such as poor formability and poor corrosion resistance as well as high cost.

Our invention is a gasoline tank which employs a particular type of maleic anhydride modified polypropylene as the coating on electroplated chrome-chrome oxide coated steel, commonly known as tin-free steel. The new gasoline tank construction combines the strength of steel with the unique adhesive and corrosion-resistant properties of the maleic anhydride-polypropylene polymers of the specific type we employ. In particular, the gasoline tank is resistant to attack by gasoline, alcohol which may be mixed in the gasoline, and water which may be condensed or otherwise make its way into the tank. Oxygen tends to dissolve in the liquids present in the tank, which otherwise would accelerate the corrosion of the metal.

An example of the manufacture of the modified polypropylene is shown below.

EXAMPLE 1

One hundred fifty (150) g of powered polypropylene having a melt flow of 1.6 g/10 min. was blended with the following additive for 30 seconds in a Waring blender at maximum speed to form a masterbatch.

| | | |
|---|---|---|
| DTH-4A | 0.6 g | 250 ppm of final blend |
| BHT | 3.4 g | 1500 ppm of final blend |
| Ethyl 330 | 2.3 g | 1000 ppm of final blend |
| Irganox 1010 | 4.5 g | 2000 ppm of final blend |
| Maleic anhydride | 11.3 g | 4000 ppm of final blend |
| Lupersol 101 | 0.9 g | 400 ppm of final blend |

The masterbatch was blended with more of the same powder to form a 5-lb. charge to a vee blender where it was blended for 30 minutes.

The powder was then fed to a 1-inch Killion extruder for further mixing and grafting of the maleic anhydride. The peroxide, "Lupersol 101",—2,5 dimethyl 2,5-di(tert butyl peroxy hexane) hastens the breakdown of the propylene polymers as is known in the art of controlled rheology. Any peroxide known to be useful for that purpose is useful in our invention.

Extrusion Conditions

| Heater Settings | |
| --- | --- |
| Zone 1 | 405° F. |
| Zone 2 | 430° F. |
| Zone 3 | 445° F. |
| Zone 4 | 430° F. |
| Die | 445° F. |
| Melt Temperature | 451° F. Speed Setting - 4 |
| Pressure | 500 psig |

The product pellets had a 31 g/10 min. melt flow and were laminated to tin-free steel as described in Example 2.

We have found that a thermal and oxidative stability additive such as BHT is necessary to control the action of the peroxide, as may be seen from Table 1 below.

TABLE 1

| MA Added, ppm | BHT Added, ppm | Final MF (g/10 min.) | Grafted MA, ppm |
| --- | --- | --- | --- |
| 5,000 | 0 | 26 | 5,050 |
| 10,000 | 0 | 28 | 8,530 |
| 10,000 | 1,000 | 24 | 7,930 |
| 10,000 | 2,000 | 17 | 7,760 |

The melt flow of the material is a function of the molecular weight; those samples having high melt flows (greater than 100 g/10 min.) were cracked too extensively and are not appropriate for use in our invention because of processing difficulties and reduced physical properties. The melt flow of the MA-modified product should be about 5 g/10 min. to about 100 g/10 min., preferably in the range 5 g/10 min. to 50 g/10 min.

Example 2 describes a procedure for applying the maleic anhydride-polypropylene thus made to a substrate, with the results shown in Table 2.

EXAMPLE 2

The tin-free, or ECCO, steel ("TFS") plate was cleaned with xylene (remove oil and dirt); 5 g of pellets was placed on the steel within a 2-mil-thick by 6-inch-square brass template; 2-mil Mylar films were placed over the samples and under the TFS; Teflon-coated Al plates were then placed over the Mylar films; this multi-layer composite was then placed in a Carver press which had been heated to 425° F.; press closed to 2 tons/in.² for 30 seconds, 5 tons/in.² for 30 seconds, 8 tons/in.² for 30 seconds, 10 tons/in.² for 30 seconds; pressure was then released; the press was repressured to 15 tons for three minutes; the press was opened and composite removed. The Teflon-coated plates were removed, and the remainder placed between two 12-inch-square by ½-inch-thick Al plates for rapid cooling of the laminate. After five minutes cooling, the Mylar was stripped off, and the template removed. The laminated portion of TFS was then cut into 2-inch by 4-inch pieces for environmental testing.

TFS was also laminated with MA-modified polypropylene film, (made by continuous extrusion chill-roll casting), substituted for pellets, without a template, using a hot-press pressure of 1 ton for 2 minutes.

Other TFS laminates were made using MA-modified polypropylene pellets followed by laminating polypropylene or propylene-ethylene copolymer films over the previously prepared laminate.

TFS 2-layer laminates were prepared also, in one step, by simultaneously hot-pressing two films—one of MA-modified polypropylene (next to the metal), and the other of unmodified polypropylene (outer film).

Still other TFS 2-layer film laminates were made, in two steps, by hot-pressing MA-modified polypropylene film (next to metal) with films of polypropylene or propylene ethylene copolymer films. Suitable coatings may also be made with blends of polypropylene and MA-modified polypropylene in ratios of 80/20 to 20/80.

METHANOL FUELS CORROSION TESTING

Duplicate 2-inch by 4-inch coupons of the test materials were formed with an Olsen cup to 80% of failure. The formed areas were 1-inch diameter and were ½ inch from the top of the coupon. Coupons were cleaned in acetone, air-dried, and immersed in the desired test medium. After the scheduled test period, the coupons were removed from the medium and given a visual examination.

The following test media were used:

A - 85 vol % gasoline + 15 vol % methanol
B - 84 vol % gasoline + 10 vol % methanol + 5 vol % tertiary butyl alcohol + 1 vol % water
C - 100 vol % methanol
D - 85 vol % methanol + 15 vol % gasoline
E - 84 vol % methanol + 15 vol % gasoline + 1 vol % water The following test results (Table 2) were obtained.

TABLE 2

| Test Material | A | B | C | D | E |
| --- | --- | --- | --- | --- | --- |
| TPS | light rusting 1 month | light rusting 1 month | light rusting 1 month | light rusting 1 month | light rusting 1 month |
| Terne | light etching 2 months | light etching 2 months | coating dissolved 1 month | coating dissolved 1 month | light etching 1 month |
| MA-Modified Polypropylene-Coated Terne | delamination 1 month | delamination 1 month | delamination 1 month | delamination 1 month | delamination 1 month |
| Dorrlform-Coated Terne | good 1 month | good 1 month | delamination 1 month | delamination 1 month | good 1 month |
| MA-Modified Polypropylene-Coated TFS | some small blisters 1 month | some small blisters 1 month | good 1 month | few rust dots 1 month | good 1 month |
| Polypropylene Film-MA-Modified Polypropylene-Coated TFS | few small blisters 1 month | few small blisters 1 month | good 1 month | few rust dots 1 month | good 1 month |
| Polypropylene Film-MA-Modified Polypropylene-Coated TFS | few small blisters 5 months | few small blisters 5 months | good 5 months | few rust dots 5 months | good 5 months |

Tests of the new maleic anhydride-polypropylene coated tin-free steel tanks have shown the laminate to be superior to other types of steel materials for contact with a wider range of gasoline-alcohol-water mixtures. In addition, the laminate retains excellent adhesion during and after forming operation. Outstanding forming characteristics were also noted.

These tests and their results are as follows: Laminated samples were (1) drawn into 307×306 cups using a MTS Systems Corp. Model 865 laboratory drawing press and, (2) drawn into 28 mm caps using an Olsen Cup Tester (draw ratio of about 1.9). The cups and caps showed no delamination after (1) either steaming for 60 minutes at 250° F. and 15 psig or, (2) seeping in boiling tap water for 60 minutes. No delamination was observed after drop impacting (ASTM 2794-69) or 80° bending.

It is to be understood that the term "polypropylene" includes polymers primarily of propylene and including as much as 25% ethylene. Some commercially available and suitable polypropylenes, known as "impact polypropylenes", contain ethylene in the range of 7–10%, commonly 2–25%.

The reactive processing (i.e. extruding in the presence of a peroxide) of the polypropylene, should be conducted in the presence of up to about 2% maleic anhydride, preferably about 0.3 to about 1.5%.

As indicated above, the terms "tin-free steel" and electroplated chrome/chrome oxide steel are used synonymously throughout this specification. ECCO steel is blackplate additionally processed and electroplated with up to about 5 or 6 milligrams of metallic chromium and chromiun oxide per square foot, determined as trivalent chromium. Coatings of the treated polymer on the ECCO (tin-free) steel should be at least about 0.5 mil, and need not be more than about 15 mil.

We claim:

1. Tin-free steel having a coating thereon, at least 0.5 mil thick and adhering directly to the metal, of maleic anhydride modified crystalline polypropylene having a melt flow less than 100 g/10 min. said coating having been made by the reactive processing of a propylene polymer with maleic anhydride in the presence of a peroxide.

2. A gasoline tank made of the coated tin-free steel of claim 1.

3. A gasoline tank of claim 2 wherein the coating is on both sides of the tank walls.

4. The tin-free steel of claim 1 wherein the propylene polymer contains about 2 to about 25 weight percent ethylene.

5. A gasoline tank made of the coated tin-free steel of claim 4.

6. The tin-free steel of claim 1 wherein the propylene polymer contains about 7 to about 10 weight percent ethylene.

7. The tank of claim 2 having an outer film of polypropylene.

8. The tin-free steel of claim 1 wherein the propylene polymer has been reactively processed in the presence of about 0.3 to about 1.5 weight percent maleic anhydride.

9. A gasoline tank made of the coated tin-free steel of claim 8.

10. The tin-free steel of claim 1 wherein the peroxide is 2,5 dimethyl 2,5-di(tert butyl peroxy hexane).

11. A gasoline tank made of the coated tin-free steel of claim 10.

12. The tin-free steel of claim 1 wherein the polypropylene and maleic anhydride have been reactively processed in an extruder.

13. Tin-free steel coated directly with polypropylene having an ethylene content of up to about 25% by weight and a maleic anhydride grafted content of 0.3 to 1.5 weight percent, blended with polypropylene having an ethylene content of up to about 25% by weight, in a ratio of about 20 to 80 weight percent.

14. Tin-free steel of claim 13 wherein the coating has a thickness of 5 to 15 mils.

* * * * *